United States Patent [19]

Callahan et al.

[11] Patent Number: 5,027,291
[45] Date of Patent: Jun. 25, 1991

[54] APPLICATION EXIT FOR POTENTIALLY PICKABLE PRIMITIVES IN A GRAPHICS SYSTEM

[75] Inventors: Robert M. Callahan, Woodstock; Bruce C. Hempel, Tivoli, both of N.Y.

[73] Assignee: International Business Machines Corporation, Armonk, N.Y.

[21] Appl. No.: 124,726

[22] Filed: Nov. 24, 1987

[51] Int. Cl.5 .................. G09G 1/00; G06F 15/62
[52] U.S. Cl. .................................. 364/521; 364/518; 340/706; 340/709
[58] Field of Search ............. 364/521, 718, 518, 522; 340/709, 712, 710, 706, 707, 708

[56] References Cited

U.S. PATENT DOCUMENTS

| | | | |
|---|---|---|---|
| 4,656,603 | 4/1987 | Dunn | 364/900 |
| 4,709,348 | 11/1987 | Horn et al. | 364/900 |
| 4,791,583 | 12/1988 | Colburn | 364/522 |
| 4,807,142 | 2/1989 | Agarwal | 364/200 |
| 4,837,563 | 6/1989 | Mansfield et al. | 340/732 |
| 4,847,605 | 7/1989 | Callahan et al. | 340/709 |

Primary Examiner—Dale M. Shaw
Assistant Examiner—Phu K. Nguyen
Attorney, Agent, or Firm—William A. Kinnaman, Jr.; Mark W. Walker; J. Dennis Moore

[57] ABSTRACT

A method is described that gives local control to an application program during the drawing process when a "pickable" primitive intersects the pick window. This control is provided in such a way that the state of graphics workstation remains unaltered. Thus the application program is permitted to make "picking" or visualization decisions at the moment the pick occurs, and then resume execution of the display program wherever desired (typically, at the graphic instruction following the one that caused the pick). This capability enables application programs to provide greater functionality, usability and productivity to their users.

7 Claims, 4 Drawing Sheets

APPLICATION EXIT FOR POTENTIALLY PICKABLE PRIMITIVES IN A GRAPHICS SYSTEM

BACKGROUND OF THE INVENTION

1. Field of the Invention

This invention relates to locally programmed interactive graphics workstations in which a user selects a graphics primitive in the ,display image by means of positioning a "pick window" to create an area of the display screen active for picking.

2. Background Art

In graphics computing systems that provide the pick window function, the position of the pick window is usually visually indicated to a user by means of a tracking cursor. The workstation user 18 communicates pick window position to the display processor by means of an interactive device 20 such as a keyboard, mouse, cursor, or track ball. Such systems have a display processor ID which processes a graphics program stored in a memory sometimes referred to as a display list buffer 12 to generate a graphics image on the display screen 14 of the system (see FIG. 1). The graphics program stored in the display list buffer is produced by an application program 16 running in the system, or workstation, or on a remote host computer.

This type of workstation architecture is well known in the literature (see, for instance, Foley and Van Dam's text, Fundamentals of Interactive Computer Graphics, pages 19–20 and 200–203). The IBM 5080, described in IBM publication GA23-2012-0 ("IBM 5080 Graphics System: Principles of Operation, 5085 Model 2"), serves as one specific example of such a display list programmed workstation providing a picking function.

A common problem that must be solved in the user-interface of such a workstation is how to give the user the ability to identify which graphics primitive he or she wishes to select if more than one primitive intersects the pick window. The methods for solving this problem can be divided into two categories, those in which the "visual feedback" function is provided by the workstation independent of the application program, and those in which the application program uses the features of the workstation to perform the "visual feedback" function. Each of these categories will now be presented, along with a discussion of their advantages and disadvantages:

1. Application-provided visual feedback approaches:

One such approach available to applications for solving the problem posed by multiple pickable primitives in the pick window is for the application to give the user the ability to magnify the image when necessary. By magnifying the image, the pick window can be positioned in such a way that only the desired primitive intersects the pick window. Once the picking action has been performed on the magnified image, the user may then "demagnify" the image back to its original size. This approach, however, has the drawback that the user's productivity is reduced by the additional steps he or she must take to accomplish the magnification/-demagnification processes.

An alternative to the "magnify-demagnify" approach is for the application to provide a selective highlight or display of primitives (or high-level structures) that pass through the pick window. In order to do this, the application must take special action when it detects that the primitive being drawn intersects the pick window. Currently available graphics systems, such as the IBM 5080, offer applications the choice of handling pick events at the remote host or the workstation's general purpose processor, or locally in the display list program itself. Each of these picking modes will now be described.

a. Remote pick processing—

In the case where picks are handled at the host or workstation processor, any time a pickable primitive is drawn in the pick window the display processor immediately interrupts the host or workstation processor with the data for the pickable primitive, and suspends operation until it receives a command back from the processor. Processing of the pickable primitive is then done at the remote host instead of by the display processor. The advantage of this picking mode that control is automatically given to the processing unit that handles the pick event whenever the display processor detects that a primitive was drawn in the pick window; no overhead is added to the display list program to determine which of the intersecting primitives is to be picked. Since such a test is needed after each primitive is drawn this is a significant feature. A disadvantage of this picking mode is that it incurs the performance penalties arising from communication between the display processor and the host or workstation processor when a pick intersection occurs, and it increases the likelihood that the state of the workstation may change between the time of the pick window intersection and the time that the host or workstation processor responds.

b. Local pick processing—

In the "local" picking mode, any time a pickable primitive is drawn in the pick window the workstation saves the pick data for that primitive in a local save area, and sets an indicator for the display program to know that a pick window intersection occurred. After this, execution continues at the next graphics instruction. The display program can add instructions after each primitive is drawn to test for the occurrence of a pick window intersection, and take appropriate action to perform some sort of visual feedback if a pick window intersection did occur. This picking mode has the advantage that it permits local (display processor) processing of pickable primitives, thus avoiding the performance penalties of communicating with a remote host or workstation processor. However, "local" picking mode of current graphic workstations has the disadvantage that additional graphics instructions must be inserted at many places in the display program, thus reducing the application's performance and increasing its program storage requirements.

Due to the disadvantages listed above for the remote and local picking modes, many graphics applications to date have offered the "magnify-pick-demagnify" technique instead of providing a true high-level visual feedback function. Unfortunately, the brunt of the selection process is then put on the user of the graphics application.

2. Workstation-provided visual feedback approaches:

In these approaches, the workstation itself keeps track of those primitives that intersect the pick window, and displays or highlights them one at a time in response to some signal (such as the depression of a keyboard button) issued by the user. This is an improvement over the application-provided visual feedback approach in that the user no longer needs to magnify/demagnify the image. However, this approach has the drawback that the set of display or highlight functions available to the application is limited to those that are implemented in the hardware of the workstation. These are usually limited to simpler building-block primitives (such as lines) instead of the aggregate graphic structures an application allows its users to select. Thus, an application is often unable to visually identify the complete structure containing the pickable entity, a drawback that creates ambiguity for the user of the application. With the workstation-provided visual feedback approach, the application is not given the ability to implement the visual feedback requirements of its own unique user-interface.

SUMMARY OF THE INVENTION

According to the present invention a computer graphics system is provided, having a processor that executes a set of microcoded instructions to generate data corresponding to basic graphic elements, called primitives, in response to a main list of application display instructions. The data is used to generate a display of those primitives. The system also includes a way of defining a display region, called a pick window, for identifying for selection primitives that intersect the pick window. The invention provides a method for enhancing the selectability of pickable primitives that intersect the pick window. According to the invention a further list of application display instructions, called a selection subroutine, is provided for saving data pertaining to primitives that intersect with the pick window. The saved data is used for effecting subsequent modification of the display area to facilitate selection of the intersecting primitives. Further microcoded instructions are provided to test whether a set of microcoded instructions previously executed for generating data corresponding to a primitive caused a pickable primitive to be drawn in the pick window. If the determination is that such a primitive was drawn, the execution of the main display list is suspended, and the selection subroutine is executed. Finally, execution of the main display list is resumed at a selected instruction therein. Thus, the present invention is a new application interface built into the hardware or microcode of the display processor to enable applications to implement better visual feedback/selection functions. It should be noted that as used herein, "microcoded instruction" means an instruction provided in microcode or in hardwired logic, as contrasted with an application instruction.

According to, for example, the preferred embodiment of the present invention, a method is provided by which an application may easily control both the pre-selection and the final selection of the pickable primitive from the set of primitives which intersect the pick window. This is accomplished by creating an interface to the application for specifying the address of a display list subroutine to be automatically executed whenever a graphics instruction draws a pickable primitive that intersects the pick window. In this way, a branch from the application visualization display list program is taken whenever a "pick" or "pre-selection" occurs, and the state of the application's visualization display list program is maintained. Thus, according to the preferred embodiment, the advantages of both the remote and local picking modes are provided without having any of their disadvantages.

The foregoing and other objects, features and advantages of the invention will be apparent from the more particular description of the preferred embodiments of the invention, as illustrated in the accompanying drawings.

DETAILED DESCRIPTION OF THE PREFERRED EMBODIMENT

The preferred embodiment of the present invention, including specific structural and functional details, are disclosed herein. These specifics are merely representative, and in that regard, provide a basis for the claims herein which define the scope of the invention. It is not intended that the specifics be construed as a limitation of the principles set forth in the claims.

In the preferred embodiment of this invention, the workstation's display processor provides application control of the pre-selection process by performing the following steps after completion of each graphics instruction:

1. Testing whether or not the instruction just completed caused a pickable primitive to be drawn in the pick window region;

2. If the operation just completed caused a pickable primitive to be drawn in the pick window, the following steps are performed:

a. The address of the order after the operation that caused a pickable primitive to be drawn in the pick window is pushed onto the application's hardware stack (this enables the application's selection subroutine to return to the visualization display list program at the point from which it left when the subroutine completes execution);

b. Normal display list execution of the application's visualization display list program is suspended, and the hardware begins display list execution at the address of the selection subroutine (n.b., the selection subroutine must not draw a pickable primitive in the pick window, in order to avoid infinite recursion).

3. If the instruction just completed did not cause a pickable primitive to be drawn in the pick window, workstation execution continues with the next graphics instruction.

The workstation's display processor performs the following steps whenever a pickable primitive intersects the pick window:

1. Saving the data relevant to the primitive just drawn in a storage area for potential use at a later time;

2. Setting a flag to indicate that a pickable primitive intersected the pick window.

Figure 1:
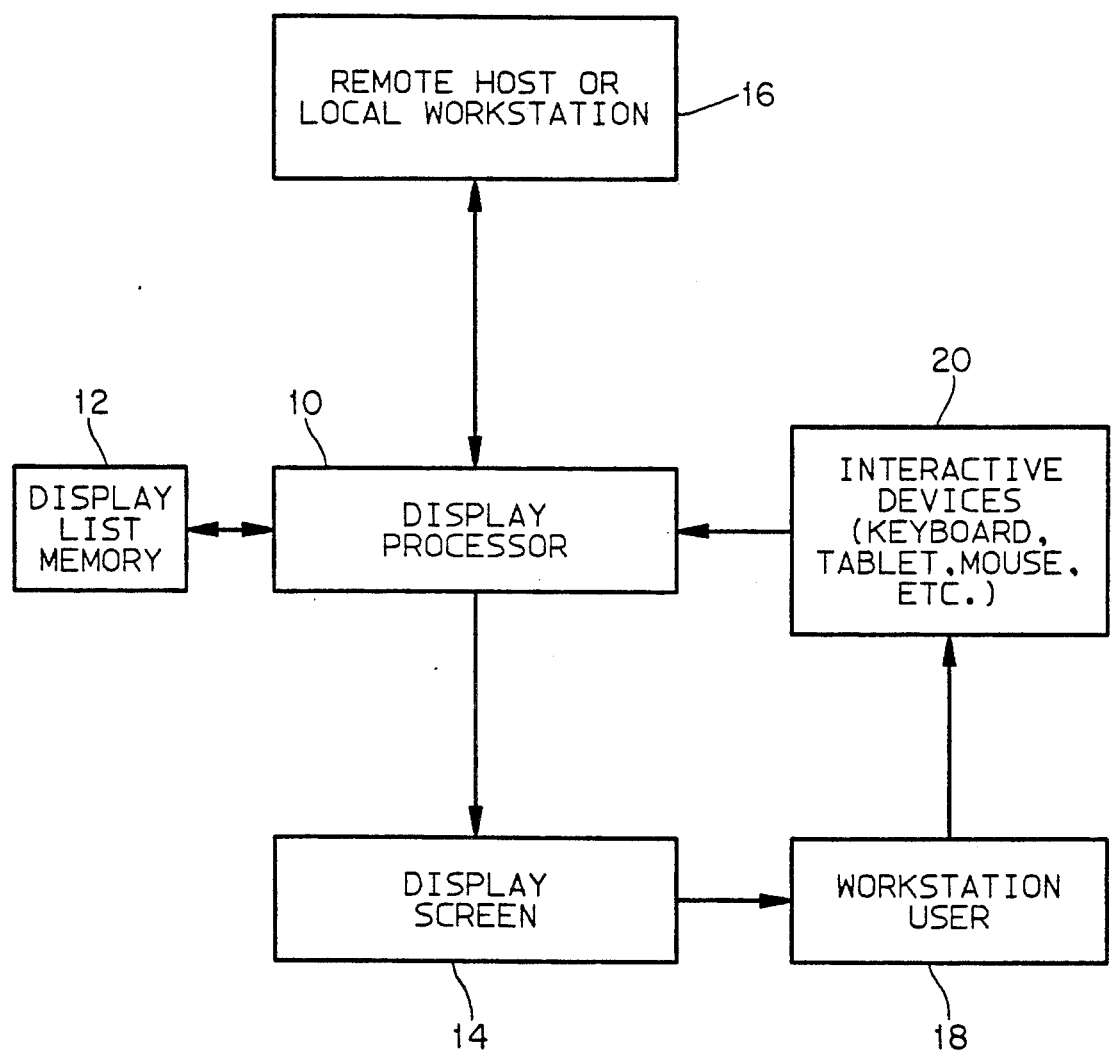
FIG. 1 is a block diagram of a graphics workstation in which the method of the present invention is applied.
Figure 2:
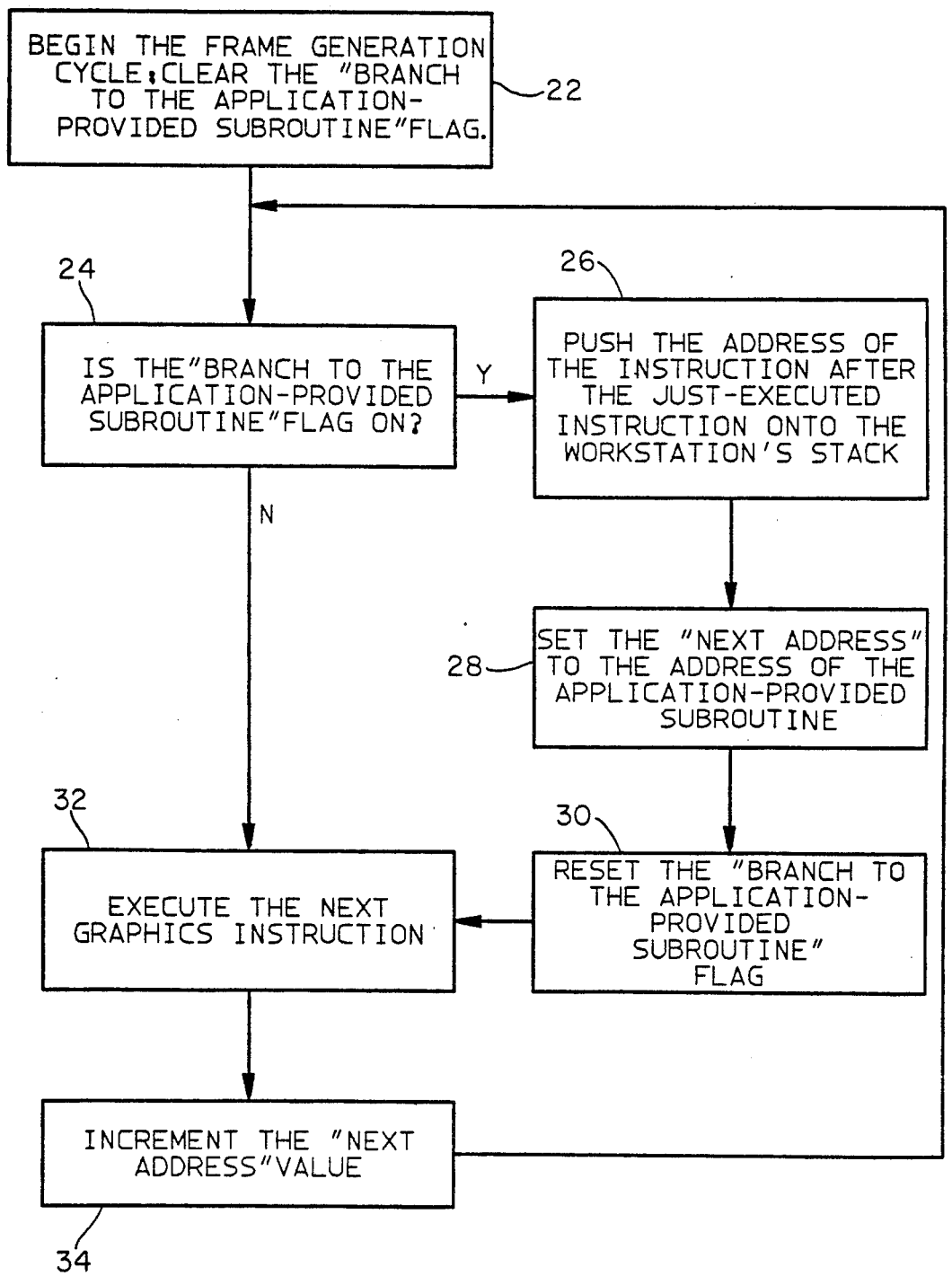
FIG. 2 is a flowchart of a first part of the preferred embodiment of the present invention.
Figure 3:
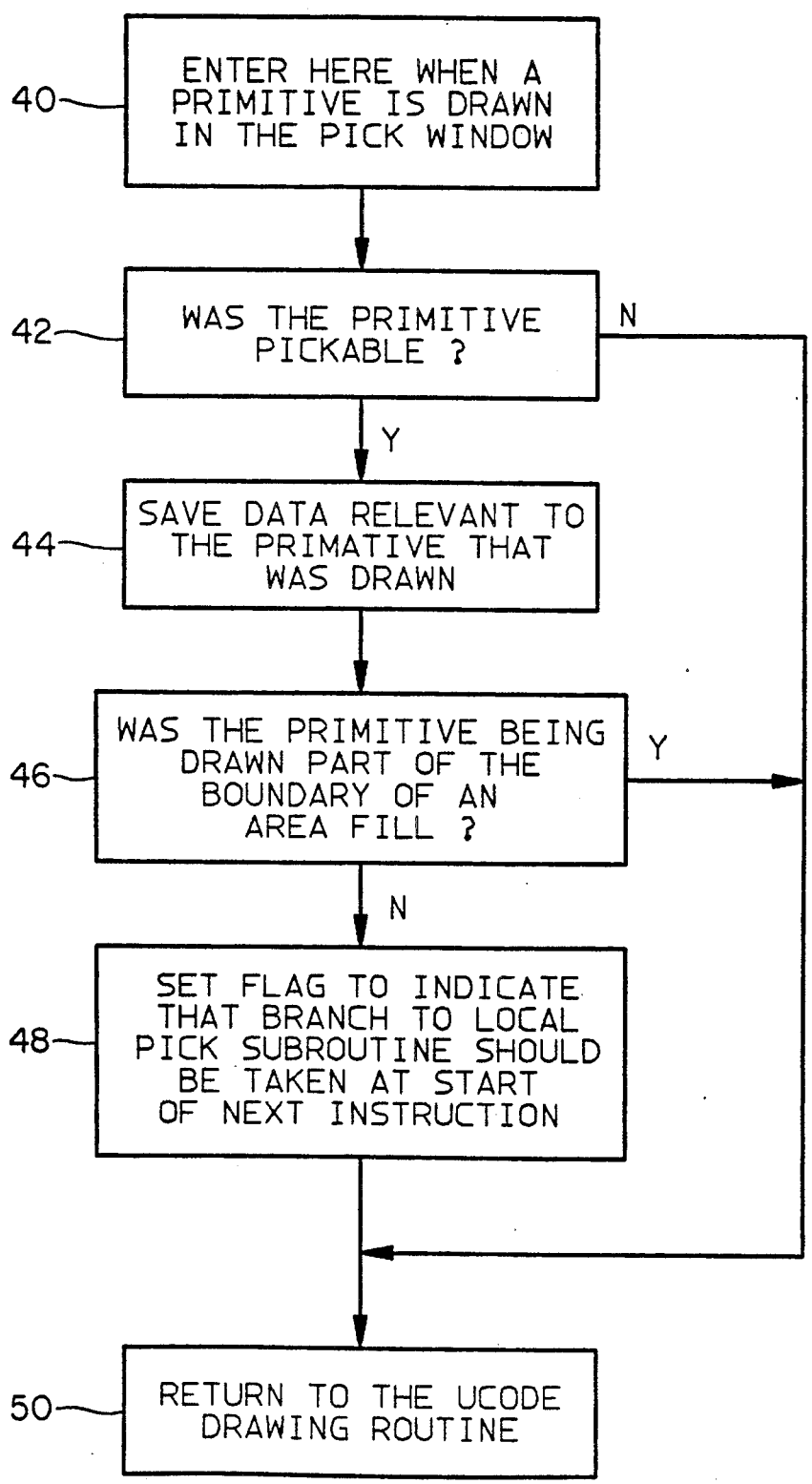
FIG. 3 is a flowchart of a second part of the preferred embodiment of the present invention.
Figure 4:
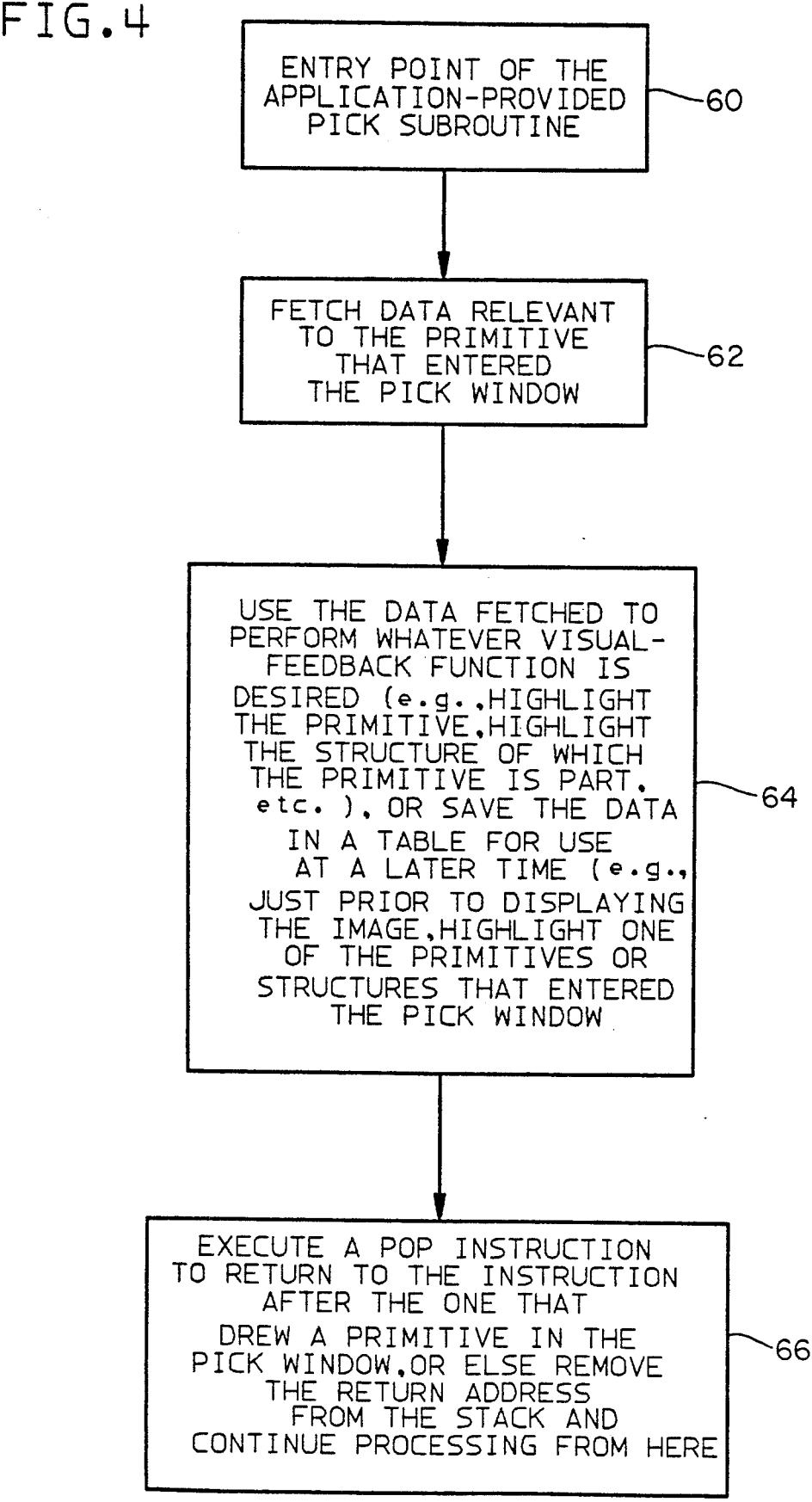
FIG. 4 is a flowchart showing typical steps in a subroutine according to the preferred embodiment of the present invention.

FIGS. 2, 3 and 4 are detailed flowcharts of how this improved method for handling potentially picked primitives would typically be implemented. FIG. 2 shows the steps by which the exit to the application-provided display list subroutine is effected, while FIG. 3 shows the steps that are performed each time a primitive intersecting the pick window is drawn. These two processes communicate with each other by means of a flag which indicates whether or not the application-provided display list subroutine is to be given control at the end of the current graphics instruction. This "branch to the application-provided subroutine" flag is tested and reset by the process in FIG. 2, and set by the process in FIG. 3.

The workstation incorporating the present invention will operate as follows. The frame generation cycle reads the graphic instructions and generates the image for display on the display screen 14. At the beginning of the cycle 22 the "branch to the application provided subroutine" flag is cleared and processing begun. The system first tests to determine whether the "branch to the application provided subroutine" flag is on 24. This test incorporates the steps described in FIG. 3 for determining whether to branch to the application subroutine. If the flag is on the address of the next instruction is pushed on to the workstation stack 26 to serve as a point of return for continued processing. The "next address" is set to the address of the application provided subroutine in step 28. This causes the execution of the application provided subroutine as described in further detail with reference to FIG. 4. At the end of processing the "branch to the application provided subroutine" flag is reset and the next graphics instruction executed 32 is continued unless that sequence was modified by the application provided subroutine. If the "branch to the application provided subroutine" flag is not on at step 24, control passes immediately to step 32. The "next address" value is incremented 34 and processing returns to the testing step 24.

Testing step 24 is executed after each graphics instruction and incorporates the steps shown in FIG. 3. Whenever a primitive is drawn in the pick window 40 control is passed to this routine. A first test 42 is made to determine whether a primitive has been designated as pickable. If it is not a pickable primitive, control returns to the drawing routine 50. If the primitive is pickable, data relevant to the primitive is saved by the system 4. If the primitive being drawn is part of the boundary of the area fill 46 control is returned to the drawing processor 50. If not, a "branch to the application subroutine" flag is set 48 and control is returned to the drawing routine 50.

Each application provided subroutine contains a similar structure as shown in FIG. 4. The entry point of the application provided subroutine 60 is the address to which the drawing processor branches. As a first step, data relevant to the primitive that entered the pick window is retrieved step 62. The data about the primitive is used in an the application specific manner by processing step 64. Finally, a "pop" instruction is executed to retrieve the next graphics instruction 66. As an alternative, the next instruction address may be removed from the stack and processing continued in the application subroutine without a return to the drawing process.

This inventive structure provides a method to implement application specific control of the picking or selection process. Thus, an application can control how potentially pickable primitives are displayed for visualization and finer selection by the operator.

The following implementation points must be observed to make the application interface of the preferred embodiment work well:

1. In order to avoid infinite recursion, the "pick window intersection" subroutine provided by the application must not draw a pickable primitive in the pick window.

2. In order to provide meaningful data to the visualization display program, the workstation hardware must defer transferring control to the "pick window intersection" subroutine until an "atomic" drawing operation completes (e.g., during an area fill operation, the workstation hardware must complete the fill process prior to transferring control to the application's selection routine, even if the area fill boundary intersected the pick window; this is because the area fill primitive is the item of interest, not the boundary of the area fill).

According to the present invention, the application-provided display list subroutine can immediately perform the display function programmed into the application with respect to the primitive that intersected the pick window, or it can save any data needed to perform the application's unique display or highlight functions at a later point in the image generation cycle. When the subroutine is finished, it executes a "POP" instruction to cause workstation execution to resume at the address placed on the stack prior to branching to the application-provided subroutine. In this way, each application can "customize" the workstation to achieve the user-interface it wishes to provide.

For example, if the image is that of an automobile, and a vector in the bumper passes through the pick window, the application may be programmed to highlight the vector, the bumper, or the entire car; or it can be programmed to erase the vector, the bumper, or the entire car; or any number of other combinations of useful visual effects. As another example, under application control, a user of the system could "step through" a pick window in a way which permits successive display of the structure which would be selected if the user were to signal that to the system. Since the application controls this process, it can guarantee that the item indicated to be selected will be the item that will actually be selected. Thus the user of the workstation may clearly know what item the application will select prior to the actual selection. Furthermore, the application may be programmed to permit the user to make his "final choice" at any moment during the "step through" process. All of the above-described application "customized" display functions are readily programmable to those having ordinary skill in the art.

The flowchart in FIG. 4 shows the typical steps the application-provided display list subroutine performs in handling primitives that intersect the pick window. Such a subroutine has total flexibility as to what to do when it is given control by the workstation. It can immediately use the data provided by the workstation to change the display, it can save the data in a table for use at a later time, or it can not use the data at all. When the subroutine is finished, it can return to the graphics program at the point from which it was entered, or it can be programmed to branch somewhere else and not return at all.

The data saved in this part of the preferred embodiment of the present invention depends upon the particular architecture of the graphics computer system involved. In a typical computer graphics system architecture, such as the IBM 5080 workstation, the main application program is provided as a listing of commands, and data corresponding to the primitives to be drawn in accordance with the commands. These primitives may be, for example, vectors. If data is to be saved for a vector, for example, in order to permit the application to readily provide the desired visual enhancement, the data saved is the x, y, and z of the end point of the vector, the address of the graphics instruction in the display program listing for drawing the vector, the address of the vector in the data list of the graphics instruction, and the segment name, that is, the name of the overall structure that the primitive is part of. The reason for saving the address of the primitive in the data list is that according to typical graphics architectures, a given graphics instruction may relate to a number of geometric primitives, such as a string of vectors. In order to permit the application subroutine to identify which vector primitive associated with the given graphics instruction is the one which intersects the pick window, the address of the instruction associated with that vector primitive is provided. The segment name permits the application to construct the overall geometric element of which the primitive is a part, for example, for visual enhancement of the overall geometric structure. The rather considerable flexibility afforded by this saving of data will be readily apparent to those skilled in this art.

Thus, while the invention has been described with reference to the preferred embodiment thereof, it will be understood by those skilled in the art that various changes in form and details may be made without departing from the scope of the invention.

We claim:

1. In a computer graphics system having a processor that executes sets of microcoded instructions to generate data corresponding to basic graphic elements, called primitives, in response to a main list of application display instruction, said primitives comprising a plurality of pickable primitives, capable of being selected by an operator, and a plurality of non-pickable primitives, not capable of being selected, said data being used to generate a display of those primitives, and that includes means for defining an operator defined selection region, called a pick window, for identifying for selection primitives that intersect said pick window, a method for enhancing the selectability of said plurality of pickable primitives that intersect said pick window, comprising the steps of:
   providing a further list of application display instructions, called a selection subroutine, for saving data pertaining to primitives that intersect with the pick window for the purpose of effecting subsequent modification of the generated display to facilitate selection of such intersecting primitives;
   providing further microcoded instructions to test whether a set of microcoded instructions previously executed for generating data corresponding to one of said plurality of primitives caused one of said plurality of pickable primitives to be drawn in said pick window;
   if the previous step determines that said pickable primitive has been drawn in the pick window, suspending execution of the main display list, and executing the selection subroutine; and then
   resuming execution of the main display list at a selected instruction therein.

2. A method according to claim 1 wherein said step of providing a further list of application display instructions is performed by providing a further list to
   fetch data associated with said pick primitive,
   storing said fetch data for further use, and
   when said main list of display instructions is finished execution, using said stored fetched data to effect said subsequent modification of the display area to facilitate selection of the intersecting primitive.

3. A method according to claim 2 wherein said step of providing a further list is performed by providing the visual function of stepping through a plurality of picked primitives identified by the method.

4. A method for enabling application-specific processing when one of a plurality of graphics drawing instructions draws a drawn graphics object to intersect an operator defined selection region on a computer graphics display system having a processor and a display device, said drawn graphics object defined by said drawing instruction to be either "pickable primitive" or a "non-pickable primitive", said method comprising the steps of:
   providing a plurality of application-specific drawing instructions;
   generating said drawn graphics object from said graphics drawing instruction;
   testing, without operator intervention, said drawn graphics object to determine whether said object intersects said operator defined selection region; if said object intersects said region, processing said plurality of application-specific drawing instructions;
   processing a next one of said plurality of graphics drawing instructions;
   repeating the above steps of generating, testing, and processing application-specific drawing instructions for each of said plurality of graphics drawing instructions.

5. The method of claim 4, further comprising the steps of:
   testing whether said graphics object is a "pickable primitive",
   if so, saving data associated with said graphics object and setting on an indicator that an intersection has occurred.

6. The method of claim 5, further comprises the steps of:
   testing whether said graphics object is part of a boundary of an area fill graphics object,
   if so, returning with said indicator set off,
   otherwise, setting on said indicator to indicate that an intersection has occurred.

7. The method of claim 5, wherein the step of processing said plurality of application instructions comprises the steps of:
   fetching said saved data associated with said graphics object;
   processing said data to transform said graphics object according to said application instructions; and
   determining a next graphic drawing instruction address.

* * * * *